Oct. 31, 1967  N. S. KAPANY  3,349,762
BLOOD FLOW INDICATOR AND PROCESS
Filed Oct. 21, 1964

INVENTOR.
NARINDER S. KAPANY
BY Townsend and Townsend
ATTORNEYS

United States Patent Office 3,349,762
Patented Oct. 31, 1967

3,349,762
BLOOD FLOW INDICATOR AND PROCESS
Narinder S. Kapany, Woodside, Calif., assignor to Optics Technology, Inc., Belmont, Calif., a corporation of California
Filed Oct. 21, 1964, Ser. No. 405,409
4 Claims. (Cl. 128—2.05)

ABSTRACT OF THE DISCLOSURE

Method and apparatus for the in situ determination of blood flow velocity by measuring the intensity of light transmitted or reflected by the flowing blood. By limiting the wave length of the transmitted or reflected light so that minimum variation will be produced as a result of changes in oxygen content of the blood, the intensity of the light passing through the blood will be directly related to its velocity.

This invention relates to a method of and apparatus for measuring the rate or velocity of blood flow within the vascular system of living human beings or animals.

In measuring human and animal functions it is often desirable to have means by which the velocity of blood flow at any particular artery or vein can be determined. Heretofore there has been no adequate means by which this type of measurement could be accomplished. However, with the apparatus and method provided for in this invention a reading can be obtained which is directly related to the velocity of blood flow within selected blood vessels. This is accomplished providing a probe formed in a configuration which will lend itself to insertion into the blood vessels of a living entity. The probe is formed with a reading head which projects light into the blood flow stream of the vessel and another element which is adapted to measure the quantity of light either reflected or transmitted through the area where blood flow analysis is to be measured. The intensity of light output obtained thereby is a direct analogue of the velocity of the blood flow past the probe.

An object and advantage of the present invention lies in the fact that the probe may be formed in several forms of configurations selected to adapt themselves to placement within the particular area to be measured; for example, the probe may be carried by the use of fiber optics which form light pipes within a needle similar to a hypodermic needle wherein the probe may be injected into a blood vessel in a manner analogous to the commonly practiced techniques of inserting hypodermic needles in such positions, or the probe can be formed in similar light pipes within the body of long cardiac catheters which are long flexible tubes that can be inserted through the length of a blood flowing canal so that the examination of difficult areas, such as within the heart etc., may be made to determine the flow rate.

A feature and advantage of the method of this invention lies in the fact that a flow or velocity of blood can be directly measured during conditions in which the patient is otherwise in normal condition.

In the present invention the frequency or wave length of the light is controlled by the use of appropriate filters so that wave lengths of preselected frequencies can be used to detect the blood flow rate. As a feature of the aforesaid invention the frequency selected can be such as to render the reading insensitive to variations in the blood chemistry and in particular to variations in oxygen content within the blood. It is well-known that variations in oxygen in the blood level will change the blood's light reflectance and transmission characteristics. These characteristics can be compensated for to determine the differential reading indicative of blood flow. However, light of certain preselected wave lengths offers less variation due to change in oxygen content so that variations in the oxygen content during blood flow measurement will not cause a substantial variation of the readout signal.

These and other objects, features, and advantages will be more apparent after referring to the following specification and accompanying drawing in which.

Within the present invention it has been found that blood has the characteristic of changing both its light reflecting and light transmitting properties in proportion to its flow rate, and in many instances it has been found that there is as much as a measurable 3 to 1 ratio of light transmitting properties, or reflecting properties, between blood in its static condition and blood flowing at velocities characteristic of the flow rate within the human system.

The method of this invention incorporates the insertion of a light output source within the blood flow stream and the further provision of a light pick-up mechanism within the same stream either adapted to receive reflected or transmitted light from the light output source. The reflected or transmitted light received by the detector is then converted by the use of photo multipliers and the like to electrical energy to obtain a voltage or current output which is an analogue of the light received by the detector. The voltage or current output thus obtained is directly correlatable to the flow rate of that blood which is either reflecting or transmitting the light. Although it is not known for certain it is believed that the reason that the light transmitting and reflecting properties of blood change in direct relation to flow rate is by virtue of alignment of matter carried within the blood fluid. Thus, while the blood is in a static condition, the matter is in a random orientation and when flowing at higher velocity is in aligned orientation which might be analogous to the alignment of molecules in metal that is either unmagnetized or magnetized. The degree of alignment of matter within the blood stream thus, it is believed, determines the effect of the blood on its light transmitting or reflecting properties. The alignment appears to be directly proportional to the flow rate, so that the measurement of the light reflectance or transmission is a direct indication of the blood flow velocity.

Figure 1:
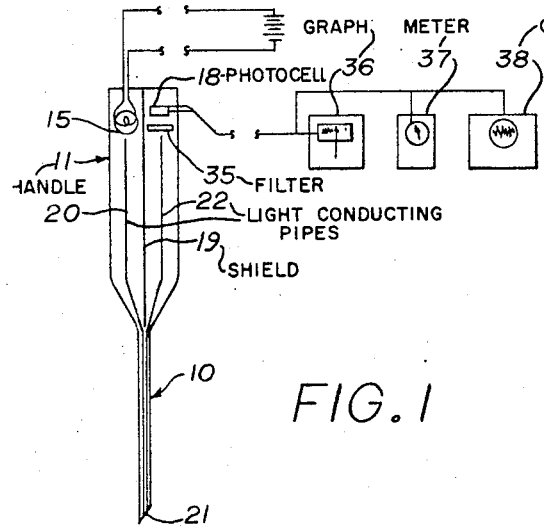
FIG. 1 is a diagrammatic view of a needle type probe used in the method of this invention.
Figure 2:
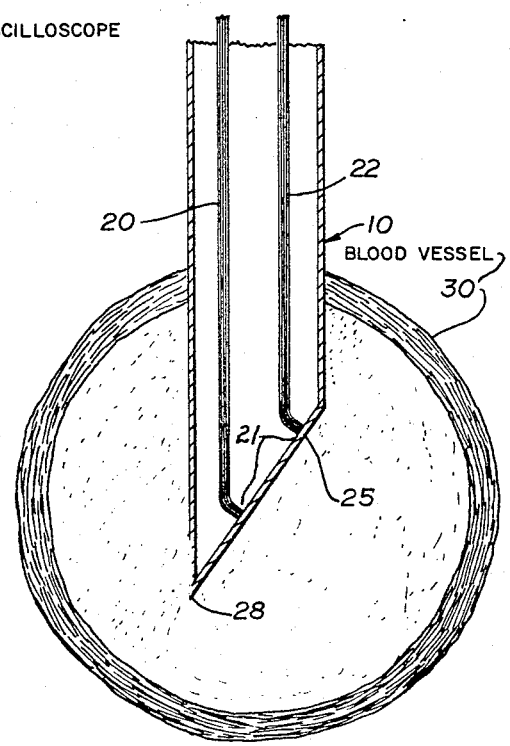
FIG. 2 is an enlarged cross sectional view of the tip of the probe of FIG. 1.

In order to practice the aforesaid method, and as can be seen particularly in FIG. 1 and FIG. 2, a hypodermic needle, generally indicated at 10, is formed having within its handle 11 a source of light 15 and a light transducing element 18, such as a photo multiplier or other photoelectric devices capable of converting optical energy into electrical energy. A shield 19 is provided within handle 11 shielding the light from light source 15 from the photo-electric device 18. A light pipe 20 is arranged for illumination from light source 15 and for termination at its distal end 21 at the tip of needle 10. A similar light pipe 22 is arranged within needle 10 to extend from the distal end 21 to the photo-electric cell 18. The arrangement of the two light rods or pipes at the distal end 21 is best seen in FIG. 2 where the two light pipes 20 and 22 terminate at a face plate 25. The face plate 25 is placed at an angle so that it defines a point 28 for penetration into the skin and through the side wall of blood vessel 30. The two light pipes 20 and 22 may be formed of fiber bundles, such as an array of 150 fibers of 50 microns diameter each in which each of the fibers is enclosed in a light-tight polyethylene sheathing. In such a light pipe each of the light pipes can be made with a diameter of approximately 3 millimeters. A filter 35 is interposed between pipe 22 and the photocell 18 in order to filter the light to a relatively narrow spectrum. It has been found, for example, that light of the red spectrum of about 640 millimicrons and in the infrared spectrum of 800 millimicrons functions satisfactorily in the employment of the aforesaid invention. The electrical output from the photocell 18 is then fed to any convenient readout, such as a graph 36, meter 37 and/or an oscilloscope 38. In this device it can be seen that light emanating from the tube 20 through transparent plate 25 is reflected by the blood to tube 22 through the transparent plate. The light is transmitted by tube 22 through filter 35 to the photo-electric cell 18 where it is converted to electrical energy. The various readout devices 36, 37 and 38 can then be calibrated to a predetermined standard so that the readings obtained thereby are a convertible analogue to blood flow rate.

Figure 3:
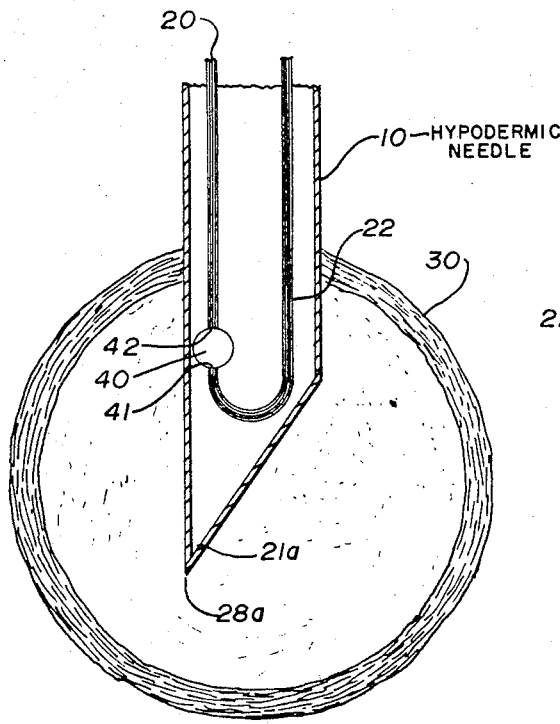
FIG. 3 is a similar cross sectional view of an alternative probe which can be used in place of the embodiment shown in FIG. 2.

As an alternative embodiment of the invention the light transmittal quality of the blood may be observed by a probe, as seen in FIG. 3 in which the tip portion 21a is formed with a point 28a to allow for easy insertion of the needle 10 into blood vessel 30. In this embodiment the light output tube 20 is arranged to terminate at an aperture 40 located at tip 21a, and the light detecting tube 22 has its distal end 41 oppositely facing the distal end 42 of the light output tube 20. In the application of the aforesaid probe blood is allowed to flow through aperture 40 so that the light passing from output tube 20 must pass through the blood flow stream in aperture 40 in order to arrive at the detecting tube 22. The electrical output from photocell 18 thus bears a direct relation to the amount of light transmitting capabilities of the blood passing through the aperture.

Figure 4:
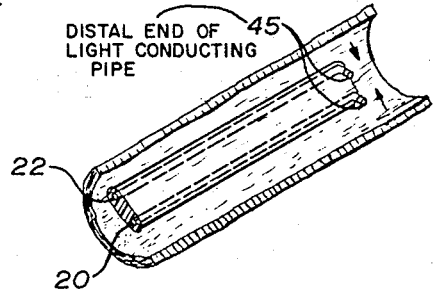
FIG. 4 is a probe which can be used for flexible long length cardiac catheters.

As a further embodiment of the invention a probe as shown in FIG. 4 is provided in which the tip 45 is arranged in a curved configuration and the light tubes 20 and 22 are formed of flexible light transmitting fibers of substantial length, i.e., five or six feet, whereby the probe can be inserted at the extremity of a blood vessel and then inserted through the artery longitudinally to the heart or other vital positions within the body. The probe may terminate for reflecting light as shown in FIG. 2 or may bend around as shown in FIG. 4 to direct light directly from the light output probe 20 to the light detecting tube 22.

It can thus be seen in this invention that the blood flow rate or velocity can be directly measured by inserting the probe directly into a blood vessel either longitudinally or transversely, and that the blood flow velocity can therein be continuously measured at the point coincident of the probe tip.

One of the beneficial features of the present invention lies in the application of filter 35 wherein the filter can be selected to control the wave length of the light received by photocell 18 from that transmitted by the flowing blood. It is well known that variations in oxygen content of the blood will substantially change the light reflecting and transmission characteristics of the blood. However, at certain critical wave lengths or frequencies there will be little or no variation of light transmission or reflectance characteristics. Thus, for example, it has been found in the case of certain canine blood that a wave length of about 800 millimicrons will not be affected by variation of the ratio of oxyhemoglobin and hemoglobin content.

The typical curve of diffuse reflectance of this type of blood when plotted in curves of 100% as against 0% of oxygen content shows that there is a narrow variation of diffused reflectance in the range below 600 millimicrons and that the range increases from 600 millimicrons to about 800 millimicrons. The 100% oxygen saturated blood increases in diffused reflectance much more rapidly than the 0% to about 700 millimicrons and then decreases in diffused reflectance with an increase of wave length, while the 0% oxygen increases to a point above the 800 millimicron range. At the 800 millimicron range there is a cross-over of the two curves in which there is theoretically no variation of light reflection occuring between the 100% and the 0% oxygen content blood. Therefore, selecting a range of 800 millimicrons for the above type of blood will result in a minimal variation in light reflectance due to changes in the oxygen content of the blood. The lower ranges below 600 millimicrons can also be selected to obtain satisfactory results. It is also noted that many types of blood exhibit very little change of diffused reflectance due to oxygen content at a range above 950 millimicrons. Therefore, in the present invention the wave length most unaffected by changes in reflectance or transmission characteristics of the blood is best suited for the measurement of the blood flow rate due to the fact that here need be little or no compensation due to changes in oxygen level. Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for obtaining the velocity of blood flowing within a blood vessel comprising the steps of: determining the wave length of light that exhibits minimum variation in transmission or reflection from changes in oxygen content of the flowing blood; inserting first and second fiber optical paths into said blood vessel, said paths terminating in optical communication with said flowing blood; directing light of a wave length in substantial conformance with said determined wave length along said first optical path into optical communication with said flowing blood; measuring the intensity of said light that passes from said flowing blood into optical communication with said second optical path; converting the measured intensity of said communicated light to an electrical signal; and determining the velocity of the flowing blood from the amplitude of the electrical signal.

2. A method in accordance with claim 1 wherein the light that is measured is that transmitted by the flowing blood.

3. A method in accordance with claim 1 wherein the light that is measured is that reflected by the flowing blood.

4. An apparatus adapted for insertion through the wall of a blood vessel to measure the velocity of the blood flow therein comprising a conduit having an outer end with the configuration of a hypodermic needle, first and second elongated flexible fiber optical pipes within said conduit, said conduit having an aperture near said outer end, each of said fiber optical pipes having one end terminating at opposite sides of said aperture within said conduit, the other end of said first fiber optical pipe connected to a light-emitting means, the other end of second fiber optical pipe connected to a light-receiving means, whereby when blood in the blood vessel is caused to flow through said aperture and light is directed from said light-emitting means into said first fiber optical pipe, the light transmitted by said second fiber optical pipe to said light-receiving means will provide an indication of the velocity of the blood in said blood vessel.

References Cited

UNITED STATES PATENTS

| | | | |
|---|---|---|---|
| 3,078,841 | 2/1963 | Brownson | 128—2.05 |
| 3,215,135 | 4/1965 | Franke | 128—2.05 |
| 3,267,932 | 8/1966 | Valliers | 128—2.05 |
| 3,279,460 | 10/1966 | Sheldon | 128—6 |

RICHARD A. GAUDET, *Primary Examiner.*

SIMON BRODER, *Examiner.*